(12) United States Patent
Salter et al.

(10) Patent No.: US 10,766,409 B2
(45) Date of Patent: Sep. 8, 2020

(54) VEHICLE LIGHT ASSEMBLY HAVING STROBE LIGHT

(71) Applicant: Ford Global Technologies, LLC, Dearborn, MI (US)

(72) Inventors: Stuart C. Salter, White Lake, MI (US); Aaron Bradley Johnson, Allen Park, MI (US); Stephen Kenneth Helwig, Farmington Hills, MI (US); Paul Kenneth Dellock, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/894,098

(22) Filed: Feb. 12, 2018

(65) Prior Publication Data
US 2019/0248278 A1    Aug. 15, 2019

(51) Int. Cl.
| | | |
|---|---|---|
| B60Q 1/46 | (2006.01) |
| B60Q 1/34 | (2006.01) |
| B60Q 1/44 | (2006.01) |
| H05B 33/08 | (2006.01) |
| F21S 43/20 | (2018.01) |
| F21S 43/31 | (2018.01) |
| H05B 45/20 | (2020.01) |
| H05B 45/37 | (2020.01) |
| F21Y 113/13 | (2016.01) |
| F21Y 115/10 | (2016.01) |

(52) U.S. Cl.
CPC ............... *B60Q 1/46* (2013.01); *B60Q 1/34* (2013.01); *B60Q 1/44* (2013.01); *F21S 43/26* (2018.01); *F21S 43/31* (2018.01); *H05B 45/20* (2020.01); *H05B 45/37* (2020.01); *B60Q 2400/20* (2013.01); *F21Y 2113/13* (2016.08); *F21Y 2115/10* (2016.08)

(58) Field of Classification Search
None
See application file for complete search history.

(56) References Cited

U.S. PATENT DOCUMENTS

| | | | | |
|---|---|---|---|---|
| 5,361,190 A | * | 11/1994 | Roberts | B60Q 1/2665 362/464 |
| 5,481,243 A | | 1/1996 | Lurie et al. | |
| 5,736,925 A | * | 4/1998 | Knauff | B60Q 1/2611 340/463 |
| 6,025,775 A | * | 2/2000 | Erlandson | B60Q 1/26 340/436 |
| 6,181,243 B1 | * | 1/2001 | Yang | B60Q 1/302 340/468 |

(Continued)

FOREIGN PATENT DOCUMENTS

| | | |
|---|---|---|
| CN | 206171297 U | 5/2017 |
| JP | 2013248906 A | 12/2013 |
| KR | 100187112 B1 | 12/1998 |

*Primary Examiner* — Crystal L Hammond
(74) *Attorney, Agent, or Firm* — Vichit Chea; Price Heneveld LLP

(57) ABSTRACT

A vehicle taillight assembly is provided that includes a housing having a light transmissive lens, a brake light located in the housing, a strobe light located in the housing and a controller activating the strobe light to strobe when the brake light is activated. The strobe light may also be activated when a turn signal light or reverse light is activated. The strobe light has a light source illuminating light onto a light pipe.

15 Claims, 5 Drawing Sheets

(56) References Cited

U.S. PATENT DOCUMENTS

| | | | |
|---|---|---|---|
| 6,351,211 B1* | 2/2002 | Bussard | B60Q 1/302 340/438 |
| 6,445,289 B1* | 9/2002 | Roberts | B60Q 1/444 340/467 |
| 6,456,206 B1* | 9/2002 | Rocca | B60Q 1/2603 307/10.8 |
| 6,700,502 B1* | 3/2004 | Pederson | B60Q 1/2611 340/463 |
| 6,710,709 B1* | 3/2004 | Morin | B60Q 1/44 340/463 |
| 6,744,359 B1* | 6/2004 | Wasilewski | B60Q 1/44 307/10.8 |
| 6,897,624 B2* | 5/2005 | Lys | H05B 33/0857 315/292 |
| 7,073,927 B1* | 7/2006 | Gorniak | B60Q 1/22 340/425.5 |
| 7,834,751 B2 | 11/2010 | Tewari | |
| 7,859,391 B1* | 12/2010 | Solis | B60Q 1/503 340/425.5 |
| 8,564,205 B2 | 10/2013 | Roberts et al. | |
| 9,487,130 B1* | 11/2016 | Pearce | B60Q 1/46 |
| 9,616,810 B1* | 4/2017 | Tucker | B60Q 1/38 |
| 9,643,535 B1* | 5/2017 | Mellem | B60Q 1/448 |
| 2002/0152045 A1* | 10/2002 | Dowling | B60Q 1/26 702/107 |
| 2003/0043033 A1* | 3/2003 | Lee | B60Q 1/44 340/463 |
| 2005/0017862 A1* | 1/2005 | Monck | B60Q 1/34 340/469 |
| 2005/0213341 A1* | 9/2005 | Wehner | B60Q 1/0041 362/545 |
| 2006/0022520 A1* | 2/2006 | Matheny | B60Q 1/448 303/167 |
| 2006/0125616 A1* | 6/2006 | Song | B60Q 1/38 340/463 |
| 2011/0291476 A1* | 12/2011 | Pribula | B60Q 1/28 307/10.8 |
| 2012/0185130 A1* | 7/2012 | Ekchian | B60Q 1/2603 701/36 |
| 2012/0299476 A1* | 11/2012 | Roberts | B60Q 1/0011 315/77 |
| 2014/0368324 A1* | 12/2014 | Seifert | G08G 1/166 340/435 |
| 2016/0144778 A1* | 5/2016 | Tucker | B60R 16/0231 340/471 |
| 2016/0236757 A1* | 8/2016 | Davis | F21S 43/237 |
| 2017/0336046 A1* | 11/2017 | LaMarche | H05B 33/0857 |
| 2017/0349093 A1* | 12/2017 | Peacock | B60Q 1/46 |

* cited by examiner

VEHICLE LIGHT ASSEMBLY HAVING STROBE LIGHT

FIELD OF THE INVENTION

The present invention generally relates to vehicle lighting, and more particularly relates to a vehicle brake or taillight assembly having a strobing light.

BACKGROUND OF THE INVENTION

Motor vehicles are commonly equipped with taillight assemblies that include brake lights to alert drivers of trailing vehicles when the vehicle brakes are applied during a vehicle braking event. In addition, the taillight assemblies commonly house the vehicle brake lights along with taillights which are typically continuously turned on when the headlights are on, turn signal lights which blink, i.e., turn on and off at a low frequency, to indicate the vehicle may be turning left or right, and reverse lights that illuminate when the vehicle transmission is shifted into reverse gear. The brake lights are typically applied continuously for as long as the brakes are applied and usually illuminate at a higher intensity relative to the taillights. The enhanced intensity of the brake light is intended to provide a readily recognizable indication of braking for other vehicle drivers; however, some vehicle drivers may not always be alert or aware of the illuminated brake light in a timely fashion. It would be desirable to provide for a lighting assembly that enhances the ability to draw the attention of drivers of other vehicles.

SUMMARY OF THE INVENTION

According to one aspect of the present invention, a vehicle light assembly is provided. The vehicle light assembly includes a housing having a light transmissive lens, a brake light located in the housing, a strobe light located in the housing and a controller activating the strobe light to strobe when the brake light is activated.

Embodiments of the first aspect of the invention can include any one or a combination of the following features:
- the vehicle light assembly includes a reverse light located in the housing, wherein the controller activates the strobe light when the reverse light is activated;
- the vehicle light assembly includes a turn signal light located in the housing, wherein the controller activates the strobe light when the turn signal light is activated;
- the controller activates the strobe light in a first color when the brake light is activated, activates the strobe light in a second color when the reverse light is activated, and activates the strobe light in a third color when the turn signal light is activated;
- the strobe light comprises a RGB LED;
- the strobe light comprises a light source operatively coupled to a light pipe;
- the strobe light further comprises a reflector and the lens located on opposite sides of the light pipe;
- the strobe light turns on and off at a frequency greater than 2 hertz;
- the strobe light turns on and off at a frequency in the range of 3-20 hertz;
- the strobe light turns on and off at a frequency in the range of 4-8 hertz; and
- the strobe light turns on and off with a duty cycle in the range of about 1-50%.

According to another aspect of the present invention, a vehicle taillight assembly is provided. The vehicle taillight assembly includes a housing having a light transmissive lens, a brake light located in the housing, a strobe light located in the housing and comprising a light source illuminating light onto a light pipe, and a controller activating the strobe light to strobe when the brake light is activated.

Embodiments of the second aspect of the invention can include any one or a combination of the following features:
- the vehicle taillight assembly includes a reverse light located in the housing, wherein the controller activates the strobe light when the reverse light is activated;
- the vehicle taillight assembly includes a turn signal light located in the housing, wherein the controller activates the strobe light when the turn signal light is activated;
- the controller activates the strobe light in a first color when the brake light is activated, activates the strobe light in a second color when the reverse light is activated, and activates the strobe light in a third color when the turn signal light is activated;
- the strobe light comprises a RGB LED;
- the strobe light further comprises a reflector and the lens located on opposite sides of the light pipe;
- the strobe light turns on and off at a frequency greater than 2 hertz;
- the strobe light turns on and off at a frequency in the range of 3-20 hertz; and
- the strobe light turns on and off at a frequency in the range of 4-8 hertz and a duty cycle of about 50%.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
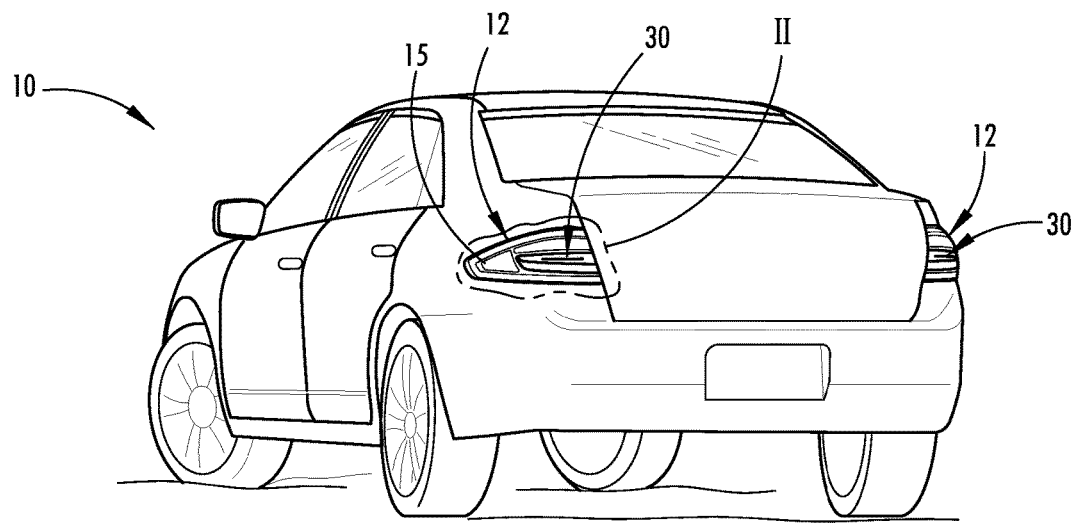
FIG. 1 is a rear perspective view of a motor vehicle having taillight assemblies equipped with strobe lights, according to one embodiment.

Referring now to FIG. 1, a motor vehicle 10 is generally illustrated having a pair of light assemblies illustrated as taillight assemblies 12 generally located on the tail or rear end of the vehicle 10 on opposite left and right sides. The vehicle 10 is shown as a passenger car having road wheels for traveling on a road; however, the vehicle 10 may include trucks, vans, SUVs, motorcycles, commercial vehicles and other vehicles that may employ one or more light assemblies and include one or more brake lights. In the embodiment shown, the taillight assembly 12 includes various lighting sources that are selectively illuminated to provide rear lighting, brake lighting, turn signal lighting and reverse lighting that can be selectively activated to be visible by drivers of other vehicles, such as trailing vehicles, as viewed from the rear side of the vehicle 10.

Figure 2:
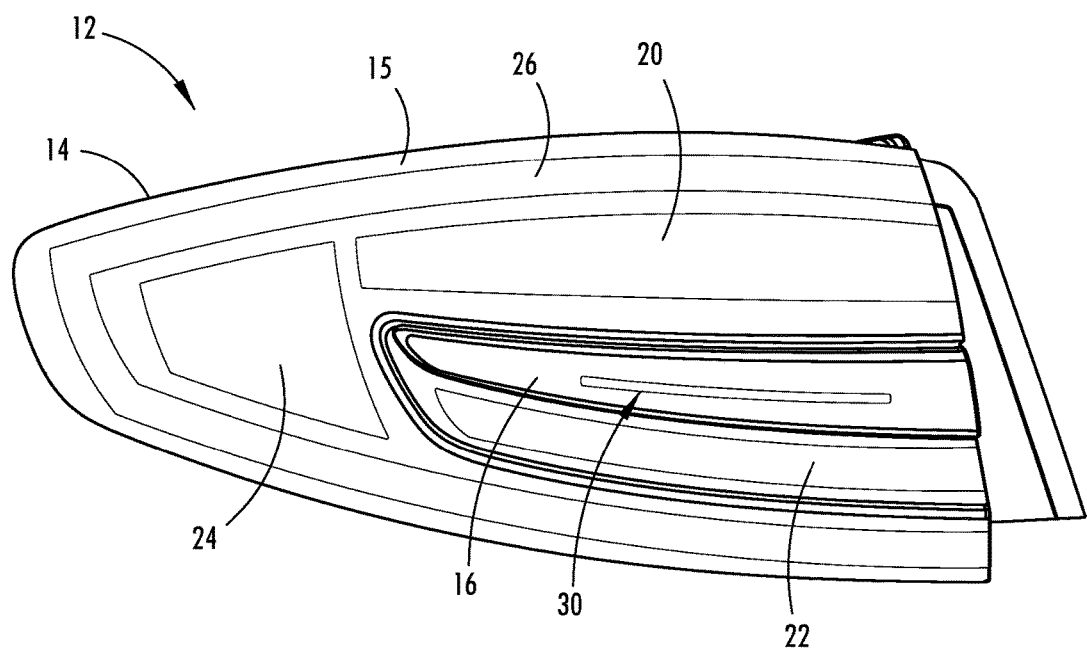
FIG. 2 is an enlarged perspective view of one of the taillight assemblies shown in section II of FIG. 1 further illustrating the strobe light.
Figure 3:
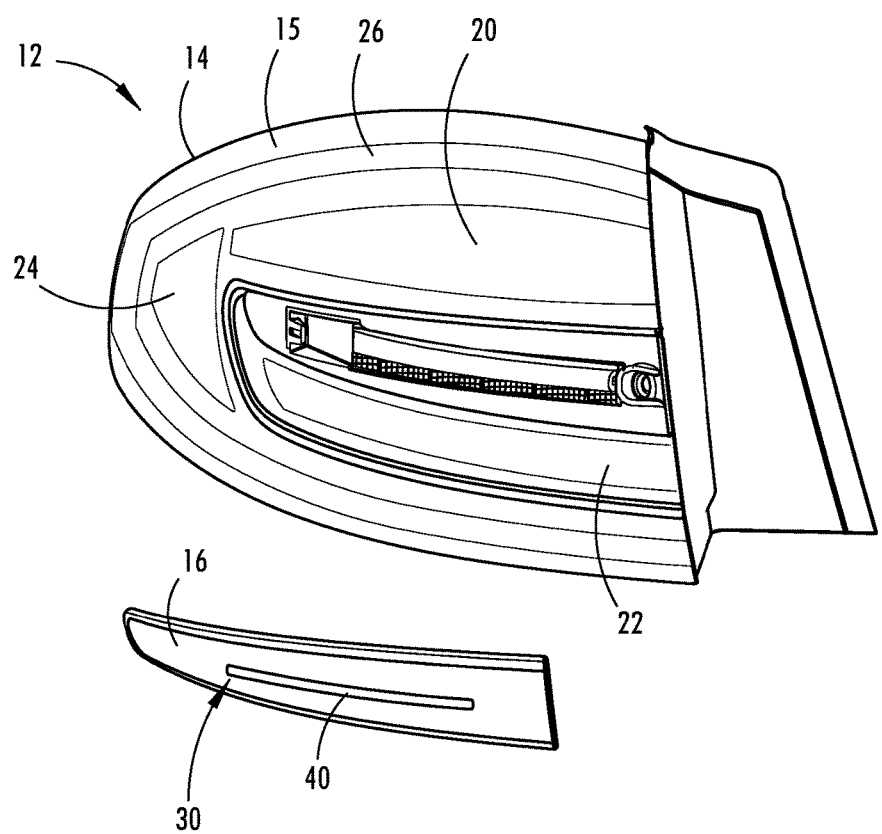
FIG. 3 is a partial exploded view of the taillight assembly shown in FIG. 2 with an outer lens exploded away to further illustrate the strobe light.
Figure 4:
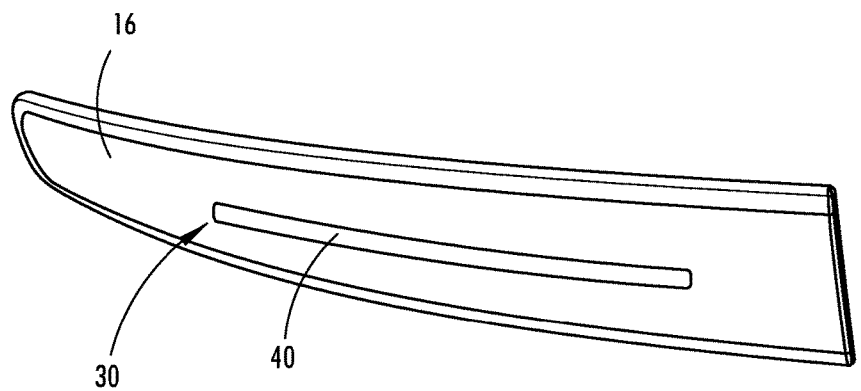
FIG. 4 is a perspective view of the exterior side of the strobe light as seen from the rear of the vehicle.
Figure 4A:
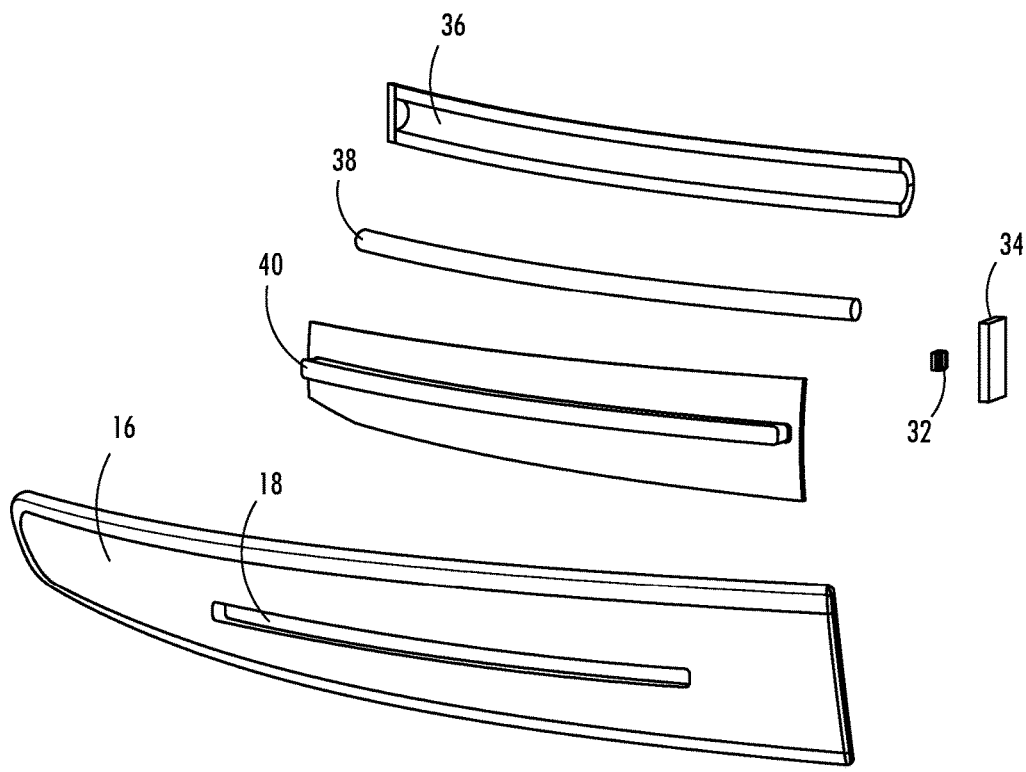
FIG. 4A is an exploded view of the strobe light as shown in FIG. 4.
Figure 5:
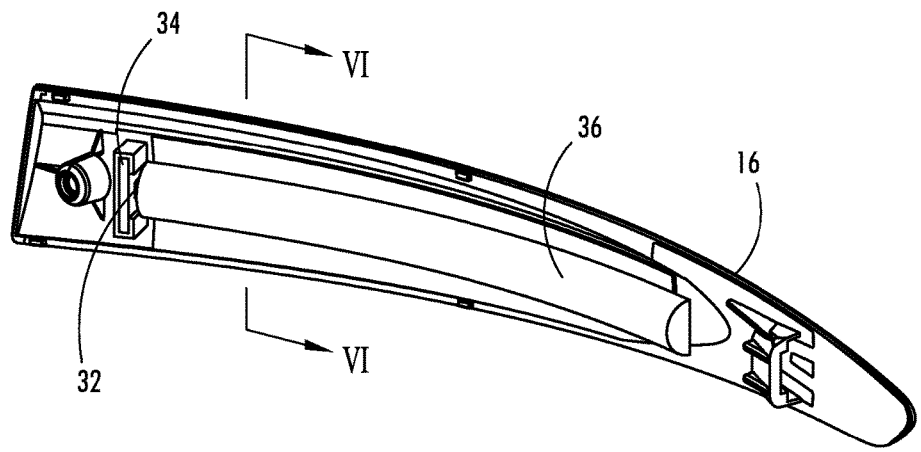
FIG. 5 is a perspective view of the strobe light as seen from the inside of the housing looking rearward.
Figure 5A:
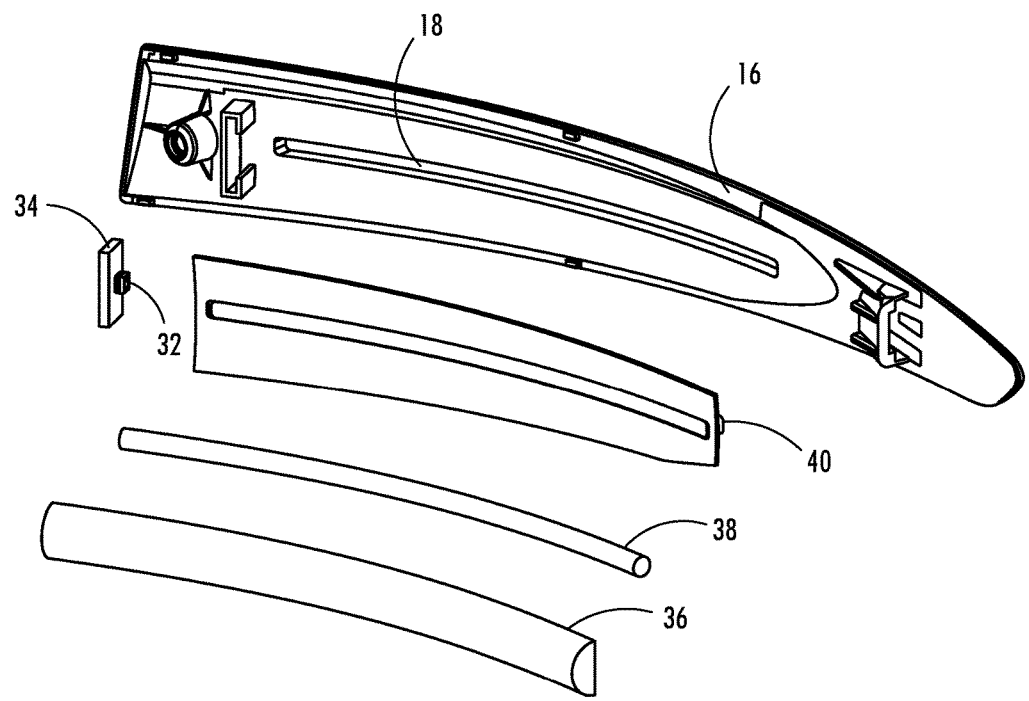
FIG. 5A is an exploded view of the strobe light shown in FIG. 5.
Figure 6:
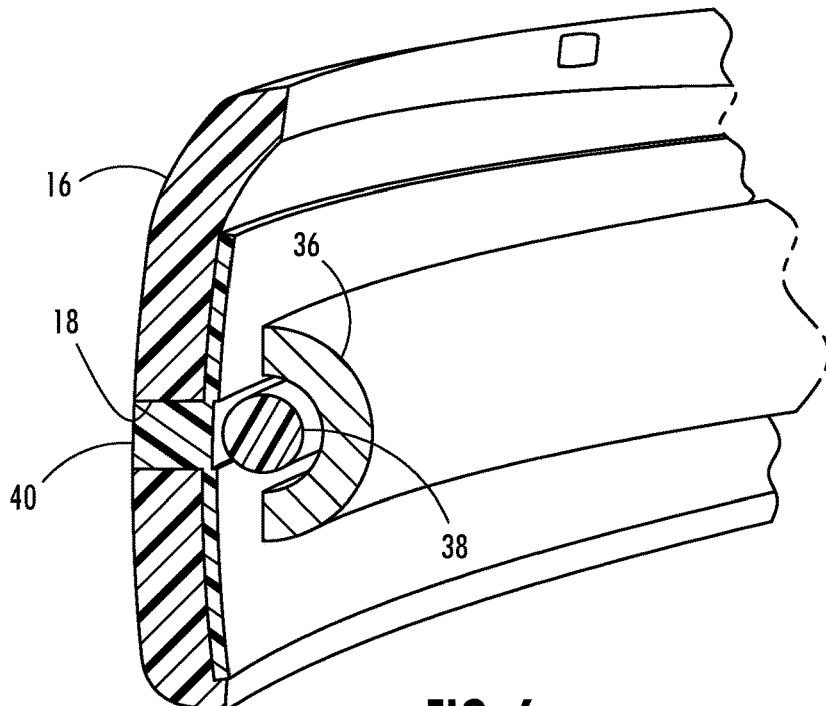
FIG. 6 is a cross-sectional view taken through line VI-VI of FIG. 5 further illustrating the strobe light in the taillight assembly.

The taillight assembly 12 is illustrated in FIG. 2 in more detail. The taillight assembly 12 generally includes a housing 14 which fits within the body such as the left or right side rear quarter body panels of the vehicle 10. The housing 14 defines a space within one compartment or a plurality of compartments for receiving lighting components and includes one or more light transmissive lenses that cover the lighting components in housing 14 and allows light to be illuminated through the one or more lenses such as lenses 15 and 16. Located within the housing 14 are a plurality of lights including a brake light 20 that illuminates lighting when the vehicle brakes are activated or applied by the driver to warn drivers of other vehicles travelling behind the vehicle 10 of a braking event. Also located within the housing 14 is a taillight 26 that provides general lighting illumination rearward of the vehicle when the vehicle headlights are turned on. A reverse or backup light 22 is also included in the housing 14 and is illuminated when the vehicle transmission is engaged in the reverse gear to indicate the vehicle may be travelling rearward in reverse. Further located within the housing 14 is a turn signal light 24 which is repeatedly illuminated on and off in a blinking pattern at a low frequency, e.g., less than 2 hertz, when a corresponding vehicle turn signal is activated to indicate that the driver intends to turn the vehicle 10 to the left or to the right, depending on which side of the vehicle that the taillight assembly 12 is located. It should be appreciated that the reverse light 22 may illuminate white light at an intensity greater than the white light emitted by taillight 26, the turn signal light may illuminate light of an amber color, and the brake light may illuminate light of a red color, according to one embodiment.

The vehicle light assembly 12 further includes a strobe light 30 that is located in the housing 14 and operable in conjunction with one or more of the brake light 20, the turn signal light 24 and the reverse light 22 as described herein. In one embodiment, the strobe light 30 is activated when the brake light 20 is activated. In another embodiment, the strobe light 30 is activated when either the brake light 20 is activated or at least one of the reverse light 22 and turn signal light 24 is activated. The strobe light 30 is controllably actuated by a controller to illuminate a high intensity strobing light e.g., at an intensity greater than the lighting intensity of the brake light 20, and more preferably at an intensity of about 2.5 times greater than the lighting intensity of the brake light 20. The strobe light 30 repeatedly turns on and off very quickly at a frequency greater than 2 hertz to give a strobing light effect to draw the attention of drivers of other vehicles including drawing attention from their peripheral vision when the brake light 20 of the vehicle 10 is activated. The strobe light 30 is located near the brake light 20 generally within the housing 14 and is activated when the brake light 20 is activated to make the brake light more noticeable to thereby catch the attention of other drivers of other vehicles, particularly for drivers of trailing vehicles that may not otherwise readily recognize the illuminated brake light 20 turned on alone, such as a distracted driver. The strobe light 30 thereby provides for an eye-catching functionality to draw attention to the taillight assembly 12 so that illumination of the brake light 20 as well as the reverse light 22 and turn signal light 24 will be more readily recognized.

The strobe light 30 is further illustrated in FIGS. 3-6, according to one embodiment. The strobe light 30 is generally shown located within the housing 14 behind a clear or light transmissive lens 16. In the embodiment shown, the strobe light 30 is configured to include a light pipe 38 that provides an elongated lighted output shown extending horizontally in the housing 14. The strobe light 30 includes the light pipe 38 shown in the shape of a rod having a cylindrical body and first and second ends. A light source 32 is operatively coupled at one end of the light pipe 38 and is mounted on a printed circuit board 34. The light pipe 38 receives strobing light illumination at one end from the light source 32 and distributes the light and diffuses it radially outward through the cylindrical wall of the light pipe 38. The light source 32 thereby illuminates light into the end of the light pipe 38 which then transmits the light throughout the rod shaped body and illuminates light radially outward from the cylindrical surface.

The strobing light pipe 38 is positioned in front of a reflector body 36. The reflector body 36 may include a semi-cylindrical body that wraps around a rear portion of the cylindrical body of the light pipe 38 and has a reflective surface on the concave inside surface. As such, light illumination exiting the rear side of the light pipe 38 is reflected forward from the reflector body 36.

Disposed in front of the light pipe 38 is an inner optical lens 40 which captures the light emitted from the front side of the light pipe 38 and disperses or focuses the light in the forward direction. The inner optical lens 40 may extends within an opening 18 within the outer light transmissive lens 16, according to one embodiment. According to another embodiment, the inner lens 40 may be disposed behind the outer light transmissive lens 16 which, in turn, allows light to be emitted through the outer lens 16. The inner lens 40 may be configured with optical light transmission properties that collect and focus the light in a desired beam pattern.

The light source 32 may include one or more light-emitting diodes (LEDs). In one embodiment, the light source 32 may include a red-green-blue (RGB) LED that may illuminate light output in one of a plurality of selected colors. For example, the light source 32 may illuminate light in a first color, such as a red color, during activation of the brake light 20, may illuminate light in a second color, such as an amber color, during activation of the turn signal light 24, and may illuminate light in a third color, such as a white color, during activation of the reverse light 22. It should be appreciated that the light source 32 may otherwise include a plurality of individual light sources each configured to generate a specific color light, according to another embodiment.

The housing 14 may be covered and sealed closed on the front side by one or more light transmissive lenses, such as outer lens 16. In one embodiment, outer lens 16 covers substantially the entire first side of housing 14. In another embodiment, multiple lenses may be located on the front of housing 14 and may cover separate compartments within housing 14. For example, lens 16 may cover a compartment within housing 14 that contain the strobe light 30 and lens 15 may cover one or more compartments of housing 14 that contain one or more other lights, such as the brake light 20, the turn signal light 24, the taillight 26 and the reverse light 22.

Figure 7:
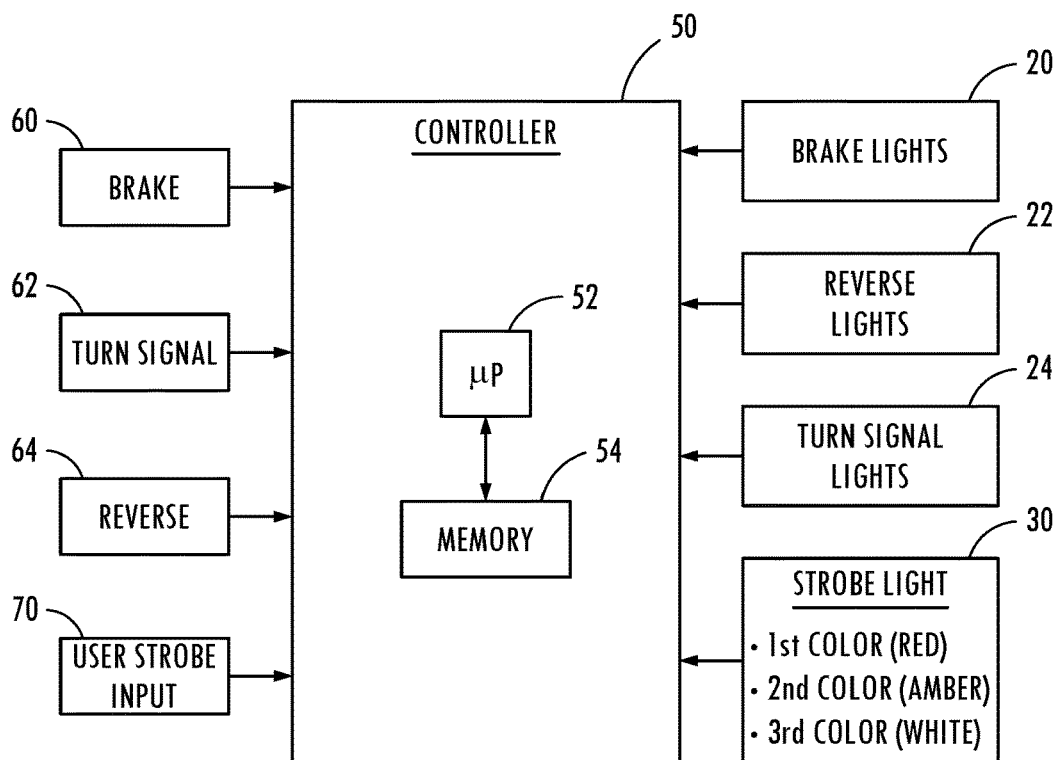
FIG. 7 is a block diagram further illustrating the vehicle light assembly and controls therefore.

Referring to FIG. 7, the taillight assembly 12 and controls therefore are further illustrated, according to one embodiment. The light assembly 30 includes a controller 50 which is shown having a microprocessor 52 and memory 54. It should be appreciated that the controller 50 may include other analog and/or digital control circuitry for processing inputs and generating outputs for controlling the lights including the strobe light 30. The controller 50 is shown receiving input signals from each of a brake input 60, turn signal input 62, and reverse gear transmission input 64. The controller 50 processes the inputs and generates outputs to control each of the brake light 30, the reverse light 22 and the turn signal light 24 associated with each taillight assembly. The controller 50 further generates an output to control the strobe light 30 to generate a strobing light at a desired frequency greater than 2 hertz, such as 3 hertz or greater, according to one embodiment. According to another embodiment, the strobe light 30 operates at a frequency within the range of 3-20 hertz with a duty cycle in the range of 1-50%, and more preferably at a 50% duty cycle. In a more specific embodiment, the strobe light 30 operates at a frequency in the range of 4-8 hertz with a duty cycle of about 50%.

The strobe light 30 is controlled to illuminate a strobing first color light when the brake light is activated. The strobe light 30 is further controlled to illuminate a second color light when the reverse light 22 is activated. The strobe light 30 is further controlled to illuminate a third strobing light of a third color when the turn signal light 24 is illuminated. The first, second and third colors are different colors, according to one embodiment.

The taillight assembly 12 may also include a user strobe input 70 that allows a user, e.g., driver, to set a variable activation speed (i.e., frequency) of the strobe light 30 for a personal setting. The user strobe input 70 may also allow for adjustment of the flashing pattern, color and intensity of the strobe light 30. The controller 50 may thereby adjust the speed, color, pattern and intensity of strobe light 30 based on the user inputs.

Accordingly, the vehicle taillight assembly 12 advantageously provides for a strobe light 30 commonly located within a housing 14 with a brake light 20 and is activated to generate a strobing light when the brake light 20 is activated and further when the turn signal light 24 is activated and further when the reverse light 22 is activated. The strobe light 30 is illuminated at a high intensity in a manner that is highly recognizable by people outside of the vehicle, such as drivers of other vehicles, such as trailing vehicles. The strobe light 30 thereby catches the attention of people including their direct and peripheral vision and thereby serves to alert people in other vehicles that a brake light is activated and/or a turn signal light or reverse gear light is activated.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle taillight assembly comprising:
   a housing having a light transmissive lens, wherein the housing is configured to be assembled on a left or right side rear panel of a vehicle;
   a brake light located in the housing;
   a strobe light located in the housing;
   a reverse light located in the housing,
   a turn signal light located in the housing; and
   a controller activating the strobe light to strobe when the brake light is activated, the controller activating the strobe light to strobe when the reverse light is activated, and the controller activating the strobe light to strobe when the turn signal light is activated.

2. The vehicle taillight assembly of claim 1, wherein the controller activates the strobe light in a first color when the brake light is activated, activates the strobe light in a second color when the reverse light is activated, and activates the strobe light in a third color when the turn signal light is activated.

3. The vehicle taillight assembly of claim 2, wherein the strobe light comprises a RGB LED.

4. The vehicle taillight assembly of claim 1, wherein the strobe light comprises a light source operatively coupled to a light pipe.

5. The vehicle taillight assembly of claim 4, wherein the strobe light further comprises a reflector and the light transmissive lens is located on opposite sides of the light pipe.

6. The vehicle taillight assembly of claim 1, wherein the strobe light turns on and off at a frequency greater than 2 hertz.

7. The vehicle taillight assembly of claim 6, wherein the strobe light turns on and off at a frequency in the range of 3-20 hertz.

8. The vehicle taillight assembly of claim 7, wherein the strobe light turns on and off at a frequency in the range of 4-8 hertz.

9. The vehicle taillight assembly of claim 8, wherein the strobe light turns on and off with a duty cycle in the range of about 1-50%.

10. A vehicle taillight assembly comprising:
    a housing having a light transmissive lens, wherein the housing is configured to be assembled on a left or right side rear panel of a vehicle;
    a brake light located in the housing;
    a strobe light located in the housing and comprising a light source illuminating light onto a light pipe; and
    a reverse light located in the housing;
    a turn signal light located in the housing; and
    a controller activating the strobe light to strobe in a first color when the brake light is activated, the controller activating the strobe light to strobe in a second color when the reverse light is activated, and the controller activating the strobe light to strobe in a third color when the turn signal light is activated.

11. The vehicle taillight assembly of claim 10, wherein the strobe light comprises a RGB LED.

12. The vehicle taillight assembly of claim 10, wherein the strobe light further comprises a reflector and the lens located on opposite sides of the light pipe.

13. The vehicle taillight assembly of claim 10, wherein the strobe light turns on and off at a frequency greater than 2 hertz.

14. The vehicle taillight assembly of claim 13, wherein the strobe light turns on and off at a frequency in the range of 3-20 hertz.

15. The vehicle taillight assembly of claim 10, wherein the strobe light turns on and off at a frequency in the range of 4-8 hertz and a duty cycle of about 50%.

* * * * *